United States Patent [19]
Keunecke

[11] Patent Number: 5,831,076
[45] Date of Patent: Nov. 3, 1998

[54] PRODUCTION OF CELLULOSE CARBAMATE WITH IMPROVED SOLUBILITY PROPERTIES

[75] Inventor: Gerhard Keunecke, Pulheim, Germany

[73] Assignee: Zimmer Aktiengesellschaft, Germany

[21] Appl. No.: 805,949

[22] Filed: Feb. 25, 1997

[30] Foreign Application Priority Data

Aug. 31, 1996 [DE] Germany ............ 196 35 473.0

[51] Int. Cl.⁶ .................................................. C08B 15/06
[52] U.S. Cl. ............................. 536/30; 536/32; 536/38
[58] Field of Search ................................. 536/30, 32, 38, 536/58

[56] References Cited

U.S. PATENT DOCUMENTS 5,378,827  1/1995  Keunecke et al. .................. 536/30

*Primary Examiner*—Nathan M. Nutter
*Attorney, Agent, or Firm*—McDonnell Boehnen Hulbert & Berghoff

[57] ABSTRACT

The invention comprises a process for producing cellulose carbamate with improved solubility properties comprising converting cellulose with urea in an inert, liquid, organic reaction carrier, at reaction temperature in the range of 80° to 180° C. where the reaction temperature is increased as the reaction time increases.

12 Claims, No Drawings

PRODUCTION OF CELLULOSE CARBAMATE WITH IMPROVED SOLUBILITY PROPERTIES

BACKGROUND OF THE INVENTION

1. Field of the Invention

The invention relates to a process for the production of cellulose carbamate with improved solubility properties in alkali hydroxide by the conversion of cellulose with urea in an inert, liquid, organic reaction carrier.

2. Summary of the Related Art

The production of regenerated cellulose products by way of cellulose carbamate represents an environmentally friendly alternative to the cellulose xanthogenate process (Viscose). The production of cellulose carbamate is accomplished by introducing urea into activated cellulose followed by the conversion of cellulose with urea at a constant temperature, either in dry phase (U.S. Pat. No. 2,134,825, EP patents 0 057 105, 0 178 292, 0 402 605 A and 0 402 606 A) or in an inert, liquid organic reaction carrier (EP patent 0 097 685, DE patents 44 43 547 and 44 17140 A, U.S. Pat. No. 5,378,827). The temperature used in the conversion process exceeds the decomposition temperature of urea in isocyanic acid and ammonia. Increasing the reaction temperature and reaction time increases the degree of substitution of the cellulose while decreasing the solubility of the resulting cellulose in aqueous alkali hydroxide. The solution stability also decreases with increasing temperature and reaction time. Good solubility and solution stability are essential for the production of regenerated cellulose products of good quality and economically efficient execution of the process, which is characterized by highest possible cellulose carbamate concentrations of the spinning solution and minimum possible sodium hydroxide use.

Cellulose carbamate of improved solubility may be obtained by the pre-treatment of cellulose with alkali hydroxide (EP patent 0 178 292), ammonia (EP patent 0 057 105), or with enzymes (PL patent 159 085). Pre-treatment of cellulose may also be accomplished by treatment with hot water under pressure (DD patent 298 789). Post-treatment of the cellulose carbamate with water or aqueous acid under heat and pressure (DE patent 44 43 547) also provides cellulose carbamate of improved solubility. The solubility of the cellulose carbamate still needs improvement, however. The solubility characteristics cannot be improved simply by the choice of pre-treatment process, but rather requires that the pre-treatment process be matched with the choice of process parameters in the synthesis of the cellulose carbamate.

SUMMARY OF THE INVENTION

The present invention comprises a method for the conversion of cellulose with urea in an inert, liquid, organic reaction carrier, which leads to cellulose carbamate with improved solubility and storage stability of its solution.

DETAILED DESCRIPTION OF THE PREFERRED EMBODIMENTS

The present invention comprises a method for the conversion of cellulose with urea at reaction temperatures in the range of 80° to 180° C., wherein the temperature increases as reaction time progresses. Suprisingly, the conversion of cellulose with urea occurs at temperatures which are clearly below the decomposition temperature of urea in isocyanic acid and ammonia. In the present invention, the conversion reaction begins at 80°–90° C. and the reaction proceeds, with satisfactory speed, in this temperature range. Thus, it is possible to carry out the conversion reaction at significantly lower temperatures (i.e. reduced thermal stress) than with prior processes. Depending on the properties of the cellulose used as well as the type and extent of the chosen activation process, conversion may be started at reaction temperatures in the range of 80° to 110° C. The temperature is raised in a stepwise fashion when the conversion rate slows because of falling urea concentration. Only towards the end of the reaction is the conversion performed at temperatures in the range of 135° to 180° C. (temperatures employed by the prior art).

Lower reaction temperatures improve urea efficiency, reduce the formation of urea byproducts (such as biuret), and lower washing requirement needed in the removal of this poorly-soluble biuret from the carbamate formed. Biuret is more soluble in hot water, but the use of hot water in the carbamate wash is disfavored because partial hydrolysis of the carbamate can occur.

Preferably the conversion takes place in a plurality of reactors connected one to another in which the reaction temperature in each subsequent reactor is 5° to 30° C. higher than the previous reactor. The choice of temperature increment depends on the total number of reactors. When o-xylene (1,2-dimethylbenzene) is used as the inert organic reaction carrier and three reactors are chosen for the conversion reaction, a reaction temperature of 80° C. for the first reactor, about 120° C. for the second reactor and about 140° C. for the third reactor is chosen. With five reactors the corresponding temperatures would be approximately 80° C., 100° C., 120° C., 130° C. and finally 140° C., in reactors 1–5, respectively. The temperature between each successive reactor can be the same or different.

Preferably, the given reaction temperature is equal to the boiling temperature of the inert organic reaction carrier at the given reaction pressure. The evaporating reaction carrier can be used as a transport mechanism for carrying off ammonia formed as a byproduct of the conversion reaction. Individual temperature stages are set by adjusting the corresponding reaction pressure. According to vapor pressure curves (found in standard literature for example Handbook of Chemistry and Physics, CRC Press, Cleveland Ohio) increased temperature requires increased pressure. Thus, when o-xylene is used as the inert organic reaction carrier, a temperature of 100° C. is obtained at 265 mbar, 120° C. at 515 mbar and 140° C. at 920 mbar (abs.).

One requirement for the successful application of the temperature control in the production of cellulose carbamate in the method of the present invention is an intimate, uniform distribution of the urea in the cellulose. Any suitable process can be used for this purpose. Preferable processes are described in U.S. Pat. No. 5,378,827 (corresponding to DE 42 42 437 A) and application DE 44 17 140 A and are herein incorporated by reference. The recovery of cellulose carbamate from the reaction mix after the conversion is preferably carried out also according to these processes. These procedures comprise: 1) mixing the cellulose with an aqueous urea solution, 2) substituting with an inert organic reaction carrier the water portion of the mix, 3) converting to cellulose carbamate at a pressure in the range of 0.05 to 5 bar (abs.) under formation or addition of an inert vaporous or gaseous medium, which is carried off from the reaction zone together with the formed ammonia, 4) substituting the organic reaction carrier in the reaction mix with aqueous urea solution or water, and 5) separating the formed cellulose carbamate from the unreacted urea and washing it with water.

The starting material for the conversion reaction is comminuted cellulose with a degree of polymerization (DP) in the range of 200 to 1200, preferably 300 to 600 which has beenadjusted by conventional depolymerization processes. Preferred is cellulose which has not been dried during its preparation, and which is available as press-moist cellulose cake. Cellulose treated by the method of the present invention can be additionally subjected to activation by one of the aforementioned pre-treatment processes.

In the method of the present invention, cellulose is mixed vigorously with an approximately 20–50% aqueous urea solution at approximately 25°–60° C. A portion of the urea solution may subsequently be pressed out, so that in the resultant press cake, 0.5 to 3 mol urea per anhydroglucose unit of cellulose is present. In a preferred embodiment the mole ratio of urea to anhydroglucose unit is chosen such that at the end of the conversion reaction little or no urea residue is contained in the cellulose carbamate. In this way, the specific use of urea is decreased and expenses for the washing process are reduced. The exact mole ratio depends on the reaction conditions and is determined by preliminary experiments.

The inert, liquid, organic reaction carrier used in the conversion reaction can be an aliphatic hydrocarbon, such as linear or branched alkanes, or an alkyl-aromatic hydrocarbon, or a mixture of aliphatic or alkyl-aromatic hydrocarbons with boiling points in the range of 90° to 185° C. at atmospheric pressure. A preferred inert, liquid, organic reaction carrier is a mono-, di- or trialkyl benzene or a mixture thereof, whereby the total number of carbon atoms in the alkyl group(s) is in the range of 1 to 4. Such alkyl benzenes have boiling points in the preferred range which permits the conversion reaction to be conducted at pressures in the range of 0.05 to 5.0 bar. More preferred inert, liquid, organic reaction carriers are toluene (methyl benzene) and xylene (dimethyl benzene). Hydroaromatic hydrocarbons with a boiling point over 185° C., such as tetralin or decalin, are also suitable reaction carriers, provided that an inert gas, such as nitrogen or low molecular weight hydrocarbons, is supplied in the reaction zones as transport for the ammonia which forms as a byproduct of the conversion reaction.

EXAMPLES

The following examples illustrate preferred embodiments of this invention as well as preferred methods for using compositions of this invention.

Comparative Example

Example 1

3.1 kg/h cellulose containing 7% water and with a DP of 350, and which was activated by the process of DD patent 298 789, was continuously suspended in a 40% aqueous urea solution at 50° C. The mixture was then pressed out to a press factor of 3 (3 parts urea solution to one part cellulose). This mix of cellulose, urea and water was mixed under dispersion with 71.9 kg/h toluene at 105° C. and then subjected to a vaporization under atmospheric pressure at 85° C. 27.9 kg/h of the vapor, consisting of 12.6 weight % water vapor and 87.4 weight % toluene, was distilled overhead and subsequently condensed. 52.7 kg/h of a mix of cellulose, urea and toluene at approximately 85° C. was withdrawn from the vaporizer and subsequently heated to 145° C. The conversion reaction was performed in four stirring reactors that were sequentially connected. The pressure in the reactors was under approx. 3 bar and the total reaction time was 120 min. Ammonia formed by the conversion reaction was quickly diverted out of the reactors by the toluene vapor formed. The conversion reaction product was subsequently cooled to 90° C. and filtered. The resulting 10.4 kg/h filter cakes contained 30% cellulose carbamate, 20% urea and 50% toluene. These filter cakes were then suspended in 96.7 kg/h aqueous urea solution at 85° C. The suspension was evaporated until the toluene was completely removed. 5.9 kg/h vapor which consisted of 87.4 weight % toluene and the rest of water vapor were distilled overhead. 101.1 kg/h of a suspension of cellulose carbamate in urea solution was removed from the vaporizer and cooled from 85° C. to 50° C. by flash evaporation. Thereby, the urea concentration of the aqueous phase rose from 40 weight % to approx. 45 weight %. This suspension was then filtered and washed with water. Approx. 6.9 kg/h wet cellulose carbamate with a moisture content of approx. 55% and a degree of substitution of 0.2 resulted.

The cellulose carbamate thus obtained was dissolved to saturation in 7 weight % aqueous sodium hydroxide at 0° C. A clear, completely dissolved solution of up to 8.0 weight % cellulose carbamate, relative to dry mass, was produced. Cellulose carbamate concentrations of greater than about 8.0 weight % could not be completely dissolved. The 8 weight % solution had a storage stability at +5° C. of approximately 12 to 13 h., afterwhich jellification of the solution could be observed.

Example 2

The method of Example 1 was repeated, except the mix of cellulose, urea and toluene leaving the vaporizer at 85° C. was warmed to only 90° C. (as opposed to 145° C.) and was converted in the four stirring reactors sequentially connected wherein the temperatures and pressures were 90° C. and 533 mbar in the first reactor, 110° C. and 1000 mbar in the second reactor, 130° C. and 2.2 bar in the third reactor, and 145° C. and 3 bar in the fourth reactor. The reaction time in the first reactor was 60 min and 30 min in each subsequent reactor, for a total of 150 min.

The resulting cellulose carbamate had a degree of substitution of 0.2 and was, as described in Example 1, dissolved in aqueous sodium hydroxide. A clear, completely dissolved solution of up to 9.6 weight % cellulose carbamate, relative to dry mass, was produced. The 9.6 weight % solution had a storage stability at +5° C. of distinctly greater than 24 h. The increased cellulose carbamate solubility significantly improves the economic efficiency of the spinning process.

Comparative Example

Example 3

Cellulose having a DP of 350, which was activated by the process of DD patent 298 789, was loaded with a 40% urea solution. Excess solution was pressed out such that the press factor was 2.67. The composition obtained was mixed, in a moist state, with industrial o-xylene and heated for an hour to approximately 95° C. under atmospheric pressure. During this time, the total amount of water and approximately 6 weight % of the xylene was distilled off. Subsequently, the mixture was heated in three sequentially connected reactors for a total of 120 min at 145° C. and 1.0 bar (abs.). The distilling xylene was condensed and returned to the mix in the reactors. During the last half hour ammonia development was no longer detectable. The product of the conversion reaction was separated from the xylene and washed with water.

The resulting cellulose carbamate had a degree of substitution of 0.2 and was, as described in example 1, dissolved in aqueous sodium hydroxide. A clear, completely dissolved solution of up to 7.9 weight % cellulose carbamate, relative to dry mass, was produced. The 7.9 weight % solution had a storage stability at +5° C. of approximately 12–13 h.

Example 4

The method of example 3 was repeated, except the de-watered cellulose-urea-xylene mix was heated in the first reactor to 100° C. and 265 mbar, in the second reactor to 120° C. and 515 mbar, and in the third reactor to 140° C. and 920 mbar. The reaction time in the first reactor was 70 min and 40 min in each subsequent reactor, for a total of 150 min.

The resulting cellulose carbamate had a degree of substitution of 0.2 and was, as described in Example 1, dissolved in aqueous sodium hydroxide. A clear, completely dissolved solution of up to 9.2 weight % cellulose carbamate, relative to dry mass, was produced. The 9.2 weight % solution had a storage stability at +5° C. of distinctly greater than 24 h.

While the present invention has been described by means of specific embodiments, it will be understood that modifications may be made without departing from the spirit of the invention. The scope of the invention is not considered to be limited by the description of the invention set forth in the specification and examples, but rather defined by the following claims.

We claim:

1. A process for producing cellulose carbamate with improved solubility properties comprising converting cellulose with urea in an inert organic liquid reaction carrier at a series of temperatures in the range of 80° to 180° C., wherein the first reaction temperature is less than 130° C. and each successive reaction temperature is greater than the previous reaction temperature by at least about 5° C.

2. The process of claim 1, wherein the conversion of cellulose occurs in a plurality of reaction vessels connected in series, wherein each successive reaction vessel has a reaction temperature greater by about 5° to 40° C. than that of the preceding reaction vessel.

3. The process of claim 2, wherein the reaction temperatures equal the boiling temperature of the organic reaction carrier at the pressure within each reaction vessel and the reaction temperature in each reaction vessel is set by adjusting the pressure of the reaction vessel.

4. The process of claim 1, wherein the reaction temperature at the beginning of the reaction time is from about 80° to 110° C. and at the end of the reaction time is from about 130° to 180° C.

5. The process of claim 1, wherein from about 0.5 to 3 mol urea is present per anhydroglucose unit of cellulose.

6. The process of claim 1, wherein the cellulose used is activated cellulose with a degree of polymerization in the range of from about 200 to about 1200.

7. The process of claim 1, wherein the cellulose is thermically not dried, press-moist cellulose.

8. The process of claim 1, further comprising:
   (a) mixing the cellulose with aqueous urea solution to make a cellulose-urea-water mix;
   (b) substituting the water portion of the mix with an organic reaction carrier;
   (c) converting the cellulose to cellulose carbamate at a pressure in the range of 0.05 to 5 bar under formation or addition of an inert gaseous medium;
   (d) carrying off ammonia formed in the conversion reaction with the inert gaseous medium;
   (e) substituting the organic reaction carrier in the reaction mix with an the aqueous urea solution or water;
   (f) separating the cellulose carbamate from unreacted urea;
   (g) and washing the cellulose carbamate with water.

9. The process of claim 8, wherein from about 0.5 to 3 mol urea is present per anhydroglucose unit of cellulose.

10. The process of claim 8, wherein the cellulose used is activated cellulose with a degree of polymerization in the range of from about 200 to about 1200.

11. The process claim 8, wherein the cellulose is thermically not dried, press-moist cellulose.

12. In a process for producing cellulose carbamate with improved solubility properties in which cellulose is converted with urea in an inert, liquid, organic reaction carrier, the improvement comprising performing the conversion reaction at a reaction temperature in the range of 80° to 180° C. during a reaction time, wherein the reaction temperature is increased as the reaction time increases.

\* \* \* \* \*